C. TOEPFER.
AUTOMATIC LINE WINDING ATTACHMENT FOR REELS.
APPLICATION FILED OCT. 19, 1914.
1,154,220.
Patented Sept. 21, 1915.
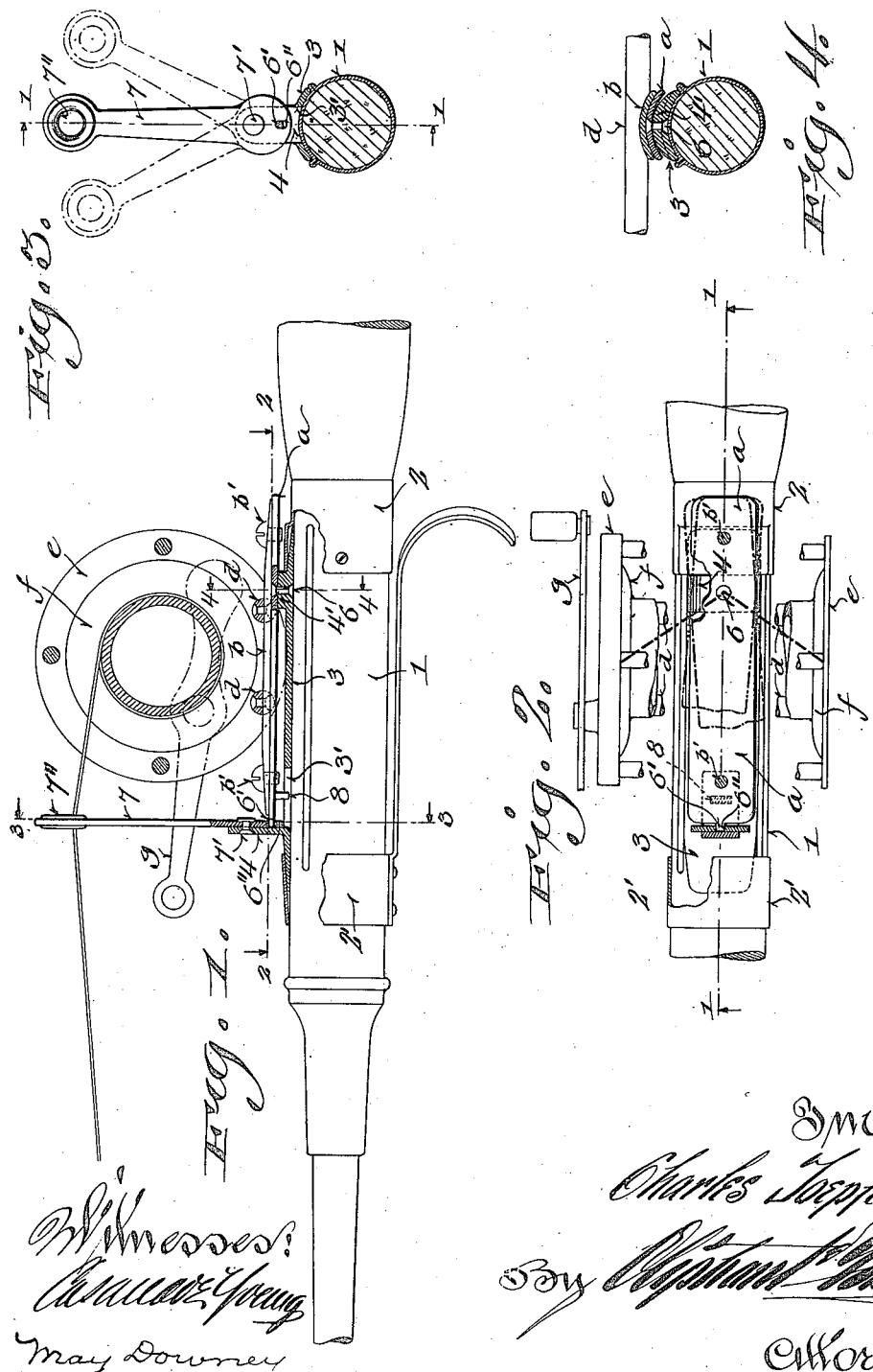

UNITED STATES PATENT OFFICE.

CHARLES TOEPFER, OF MILWAUKEE, WISCONSIN.

AUTOMATIC LINE-WINDING ATTACHMENT FOR REELS.

1,154,220.  Specification of Letters Patent.  Patented Sept. 21, 1915.

Application filed October 19, 1914. Serial No. 867,331.

*To all whom it may concern:*

Be it known that I, CHARLES TOEPFER, a citizen of the United States, and resident of Milwaukee, in the county of Milwaukee and State of Wisconsin, have invented certain new and useful Improvements in Automatic Line-Winding Attachments for Reels; and I do hereby declare that the following is a full, clear, and exact description thereof.

My invention refers especially to fishing reels and has for its object to provide a simple, economical and effective means for evenly winding the line upon the reel spool, whereby manual guiding of said line is eliminated.

My present invention is designed to simplify and improve fishing tackle such as disclosed in a patent issued to me October 15, 1912, No. 1041376, attention being called to the fact that in this patent the reel is arranged to oscillate transversely about the axis of the stock and is associated with a fixed guide arm.

My present invention contemplates providing an oscillatory guide arm lever, which lever is coupled to a reel frame, having a tangential movement with relation to the axis of the stock, to impart vibratory movement to the lever. By thus providing means for imparting movement to both the line guide arm and reel frame, it is obvious that a slight movement of said reel frame can be transmitted to the vibratory guide arm, whereby a wide scope of movement of the latter is effected.

With the above object in view the invention consists in certain peculiarities of construction and combination of parts as set forth hereinafter with reference to the accompanying drawings and subsequently claimed.

In the drawings Figure 1 represents a side elevation of a fragment of the stock of a fishing rod equipped with a reel embodying the features of my invention, parts being broken away to more clearly illustrate structural features and parts in section as indicated by line 1—1 of Figs. 2 and 3; Fig. 2, a detailed sectional plan view of the same, the section being indicated by line 2—2 of Fig. 1; Fig. 3, a cross-section showing the line guide lever mechanism, the section being indicated by line 3—3 of Fig. 1, and Fig. 4, a cross section through the stock and reel frame foot the section being indicated by line 4—4 of Fig. 1.

Referring by characters to the drawings, 1 represents the stock of a reel provided with a thimble 2 and a slidable sleeve 2', between which thimble and sleeve is secured in the ordinary manner a stock-receiving saddle 3 having an upturned ear 4 positioned forwardly thereof and a boss 4' at the rear end of the saddle. Vibratorily mounted upon the boss 4' is a reel frame supporting foot, which foot in this exemplification of my invention, is formed in two parts comprising a plate member *a*, and a reel-base member *b*. The plate member is pivotally confined by a stud 6 which is provided with countersunk heads, as shown, and the reel base member *b* is secured to the plate member *a* by screws *b'*. The plate member *b* comprises the ordinary equipment whereby the reel frame is attached to the stock of a rod and said member, in this instance is shown riveted to companion tie bars *d*, that connect the head rings *e* of a reel frame. The said head rings carry the ordinary type of reel *f*, motion being imparted thereto by a revoluble hand crank *g*. This construction of foot 5 is utilized as a convenient means of attaching an ordinary type of reel to the mechanism embodying my invention, but it is understood that, in some instances, the plate member *a* can be directly connected to the tie-bars, whereby the companion member *b* is eliminated. The forward end of the plate member *a* terminates with a finger 6, which engages an aperture 6' that is formed in the short arm of a line guide lever 7. The line guide lever is fulcrumed to the ear 4 of the saddle 3 by a rivet 7' and the upper free end of said lever is formed with an eye 7", through which the line is guided in its travel toward or away from the reel *f*. Oscillatory movement of the foot 5 is limited by a lug 8, which lug depends from the foot plate *a* and extends into a recess 3' that is formed in the base of the saddle. In this particular form of saddle the recess 3' is formed by cutting the metal upon three sides to produce the ear 4, which ear is then bent upwardly, as shown.

From the foregoing description it will be observed that the frame reel as a whole is pivotally secured to the stock of the rod in such manner as to be free to swing upon a horizontal plane parallel to the axis of the rod stock, the said movement being facilitated due to the fact that the axis of oscillation is rearwardly positioned with relation to the reel frame. Hence it will be observed that when rotary movement is imparted to the reel crank *g*, side thrust upon the reel is applied in one direction during a half revolution of the crank and in the opposite direction when the crank completes the revolution, whereby the entire reel, together with the foot, is caused to vibrate upon a horizontal plane tangentially relative to the axis of the rod shank. The oscillatory movement of the reel frame as a whole is transmitted to the short arm of the vibratory guide lever 7, whereby its long arm will travel back and forth across the width of the reel or spool coincident to a winding operation in a positive manner to thus wind the line upon the reel in uniform layers, whereby bunching is eliminated. It is apparent that, owing to the effective automatic reeling of the line in uniform layers, when said line is cast from the reel, it will freely strip therefrom and avoid snarling and, furthermore, the uniform layers can be more delicately thumbed to control the direction and location of the bait which is thrown out.

I claim:

1. A reel adapted to be carried by a rod stock comprising a frame having a foot, a stock supporting saddle upon which the foot is pivotally mounted, whereby rock of the reel frame upon a horizontal plane relative to the rod-stock axis is had, a line guide lever fulcrumed to the saddle forwardly of the reel frame, and actuating means connecting the lever and foot, whereby rock of the frame foot will impart vibratory movement to said lever.

2. A casting reel comprising a rod stock, a reel frame pivoted thereto, an oscillatory line guiding lever in pivotal union with the stock, and actuating means for the lever carried by the reel frame, whereby rock of the frame upon its pivot will cause vibratory movement of levers.

3. A reel adapted to be carried by a rod stock comprising a frame, a foot carried thereby, a stock-supported saddle upon which the foot is pivotally mounted, to permit rock of the frame upon a horizontal plane relative to the rod-stock axis, the pivot being rearwardly disposed with relation to the reel frame, an ear extending upwardly from the saddle, a short and long armed line guiding lever in pivotal union with the ear, and a finger extending from the foot engageable with the short arm of said lever whereby said lever is vibrated coincident to movement of the reel-frame.

4. A reel adapted to be carried by a rod-stock comprising a frame, a foot carried thereby, a stock-supported saddle upon which the foot is pivotally mounted, whereby same frame is rendered oscillatory upon a horizontal plane relative to the rod stock axis, the pivot being rearwardly disposed with relation to the reel frame, an ear extending upwardly from the saddle, a short and long armed line guiding lever in pivotal union with the ear, and actuating means connecting the lever and foot, whereby the oscillatory movement of the foot will impart a vibratory movement to the lever.

In testimony that I claim the foregoing I have hereunto set my hand at Milwaukee, in the county of Milwaukee, and State of Wisconsin, in the presence of two witnesses.

CHARLES TOEPFER.

Witnesses:
 Geo. W. Young,
 M. E. Downey.